United States Patent [19]
Tallon

[11] Patent Number: 5,172,583
[45] Date of Patent: Dec. 22, 1992

[54] SEAL TESTER
[75] Inventor: Jacques Tallon, Annecy, France
[73] Assignee: Alcatel Cit, Paris, France
[21] Appl. No.: 758,150
[22] Filed: Sep. 12, 1991
[30] Foreign Application Priority Data
  Sep. 12, 1990 [FR] France .................. 90 11272
[51] Int. Cl.⁵ .............................................. G01M 3/22
[52] U.S. Cl. ...................................................... 73/40.7
[58] Field of Search .............. 73/40.7, 46, 49.8, 49.3; 277/2

[56] References Cited
U.S. PATENT DOCUMENTS

| | | | |
|---|---|---|---|
| 2,255,921 | 9/1941 | Fear | 73/46 |
| 3,577,769 | 5/1971 | Roberts | 73/40.7 |
| 3,762,212 | 10/1973 | Morley et al. | 73/40.7 |
| 4,282,743 | 8/1981 | Pickett | 73/46 |
| 4,553,435 | 11/1985 | Goldfarb et al. | 73/40.7 |

FOREIGN PATENT DOCUMENTS

| | | | |
|---|---|---|---|
| 2728837 | 1/1979 | Fed. Rep. of Germany | 73/40.7 |
| 2055210 | 2/1981 | United Kingdom . | |

Primary Examiner—Hezron E. Williams
Assistant Examiner—Joseph W. Roskos
Attorney, Agent, or Firm—Sughrue, Mion, Zinn, Macpeak & Seas

[57] ABSTRACT

A leak tester comprises a vacuum chamber in which a device under test is placed and a helium leakage detector connected to the vacuum chamber. The device under test is adapted to be filled with helium or with air-helium mixture through an exterior pipe entering the vacuum chamber and incorporating a coupling for connecting it to the device under test. The coupling is surrounded by a collector chamber connected by a pipe to a vacuum pump outside the vacuum chamber.

1 Claim, 3 Drawing Sheets

SEAL TESTER

BACKGROUND OF THE INVENTION

1. Field of the Invention

The present invention concerns a seal tester.

2. Description of the Prior Art

Refrigerator compressors, evaporators, SF6 circuit-breaker pole-pieces and the like are often seal tested by placing them in a vacuum chamber connected to a helium leakage detector and filling the device under test with helium or an air-helium mixture.

If there is any leak, the helium escapes and its flowrate is measured by the detector.

In this seal testing method the device under test is filled with the tracer gas through a pipe which passes through the vacuum chamber and which comprises at its end a coupling to be connected to the device under test.

One conventional coupling comprises a female part which is mounted at the end of a pipe connected to the device under test and a male part which is mounted on the test gas feed pipe, the two parts nesting one within the other. The interfaces between each part and the respective pipe and between the two parts incorporate seals. These seals must provide a perfect seal, must be impermeable to the test gas (helium) and must be able to withstand thousands of compression and decompression tests, couplings and uncouplings. These requirements are difficult to meet and it is therefore necessary to change the seals frequently, which involves dismantling the couplings.

An object of the invention is to avoid the need for frequent replacement of the seals by eliminating the need for a perfect seal at the couplings.

SUMMARY OF THE INVENTION

The invention consists in a leak tester comprising a vacuum chamber in which a device under test is placed and a helium leakage detector connected to said vacuum chamber, said device under test being adapted to be filled with helium or with air-helium mixture through an exterior pipe entering said vacuum chamber and incorporating a coupling for connecting it to said device under test and said coupling being surrounded by a collector chamber connected by a pipe to a vacuum pump outside said vacuum chamber.

One embodiment of the invention will now be described with reference to the appended drawings.

DETAILED DESCRIPTION OF THE INVENTION

Figure 1:
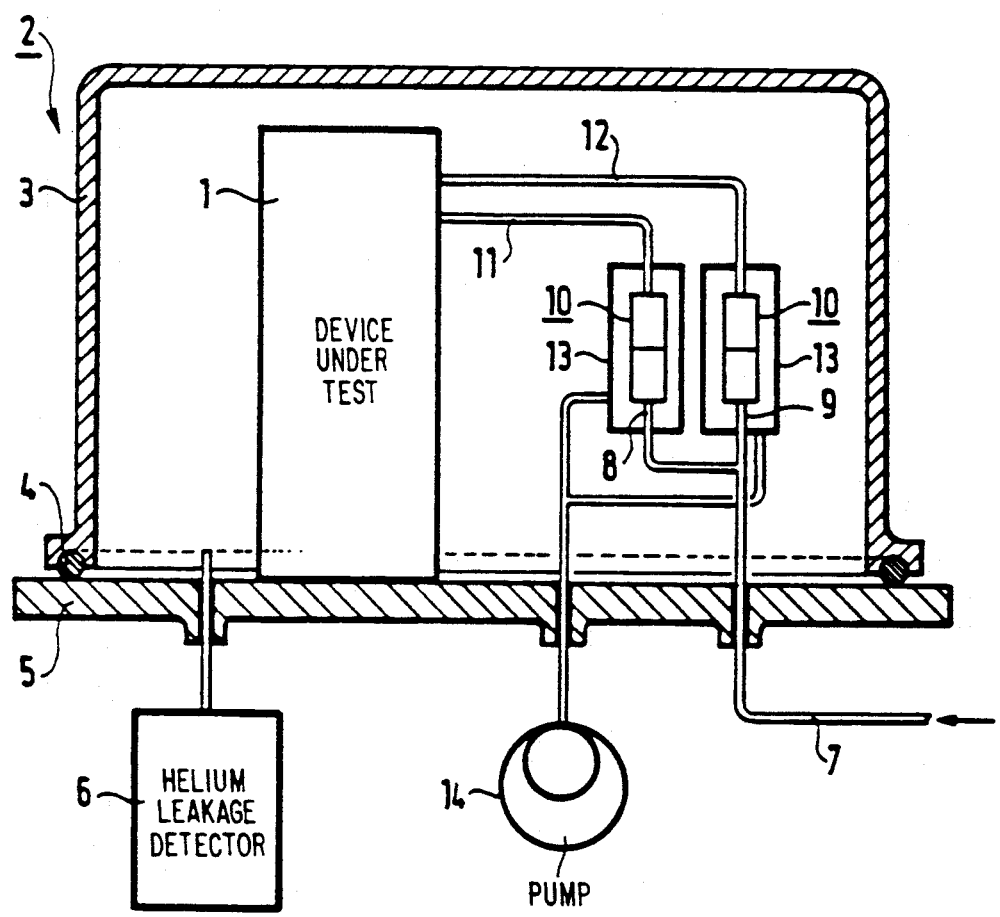
FIG. 1 shows a seal tester in accordance with the invention.

FIG. 1 shows apparatus for seal testing a device 1 which is placed in a vacuum chamber 2 comprising a bell 3 resting via a seal 4 on a support plate 5. The vacuum chamber 2 is connected to a helium leakage detector 6 and the device under test 1 is filled with helium or with an air-helium mixture through an external pipe 7 which enters the vacuum chamber 2 through the plate 5. The pipe 7 divides into two branches 8 and 9 on each of which is mounted a conventional type quick-release mechanical coupling 10. The couplings 10 are connected to the device 1 under test by pipes 11, 12.

According to the invention, each quick-release coupling 10 is entirely surrounded by a collector chamber 13 connected to a pump 14.

If the couplings 10 leak, the helium trapped in the collector chambers 13 is pumped out by the pump 14 and does not reach the leak detector 6.

The pumping rate of the vacuum pump 14 must be higher than the leakage conductance of each collector chamber, for example 1,000 times greater, so that substantially all of any flow of helium is aspirated by the pump 14.

In the examples shown, two couplings 13 are used to feed the device 1 through two separate inlets 11 and 12. Of course there could be only one coupling or more than two.

Figure 2:
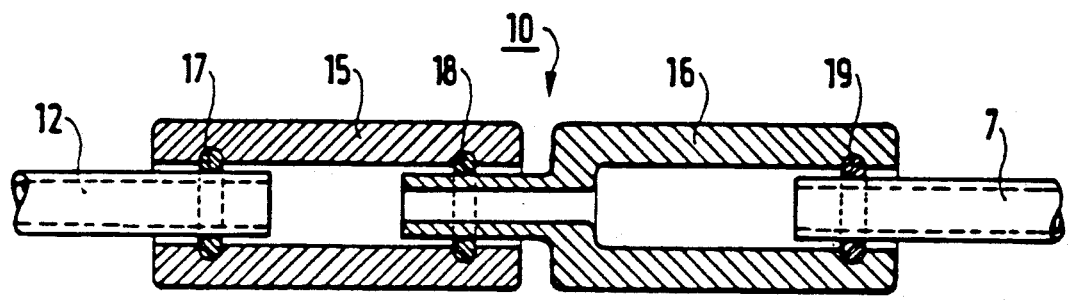
FIG. 2 shows a quick-release coupling used in the FIG. 1 device.

FIG. 2 shows a mechanical quick-release coupling 10. It comprises a female part 15 and a male part 16.

The female part 15 is connected to the device 1 by the pipe 12 and the male part 16 is connected to the helium supply hose 7. Seals 17, 18 and 19 are provided between the various parts.

Figure 3:
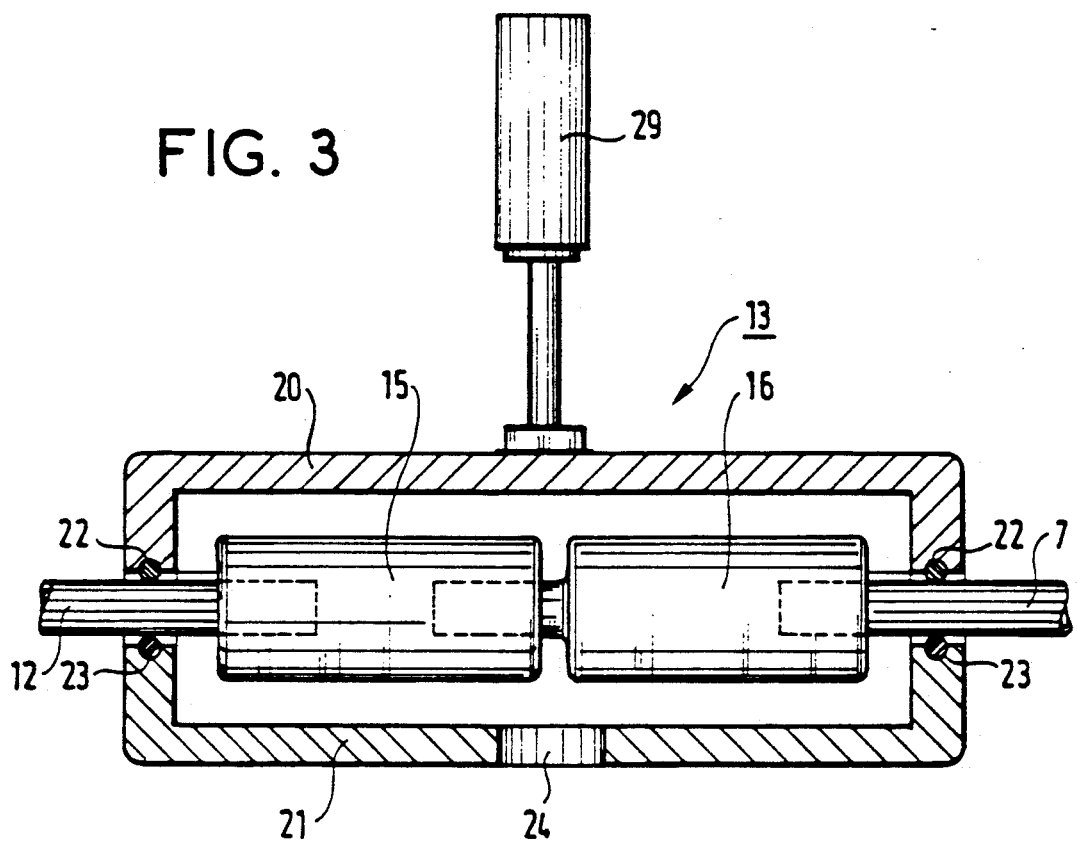
FIGS. 3 and 4 show in cross-section and in perspective one possible embodiment of collector chamber.
Figure 4:
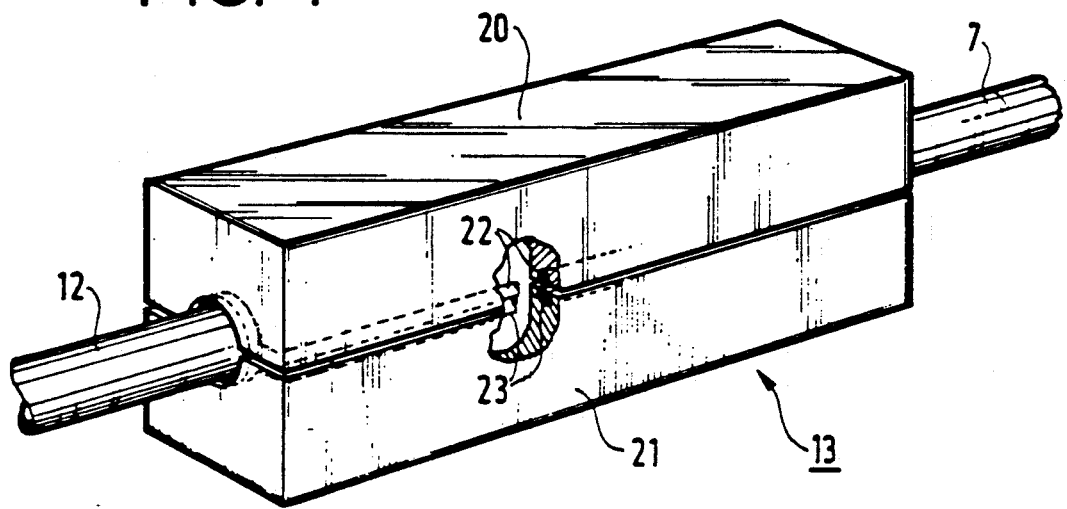

FIGS. 3 and 4 show a collector chamber 13 in two halves 20 and 21 each with a seal 22 and 23. The combination constitutes a substantially sealed chamber connected to the pump 14 at 24.

Figure 5:
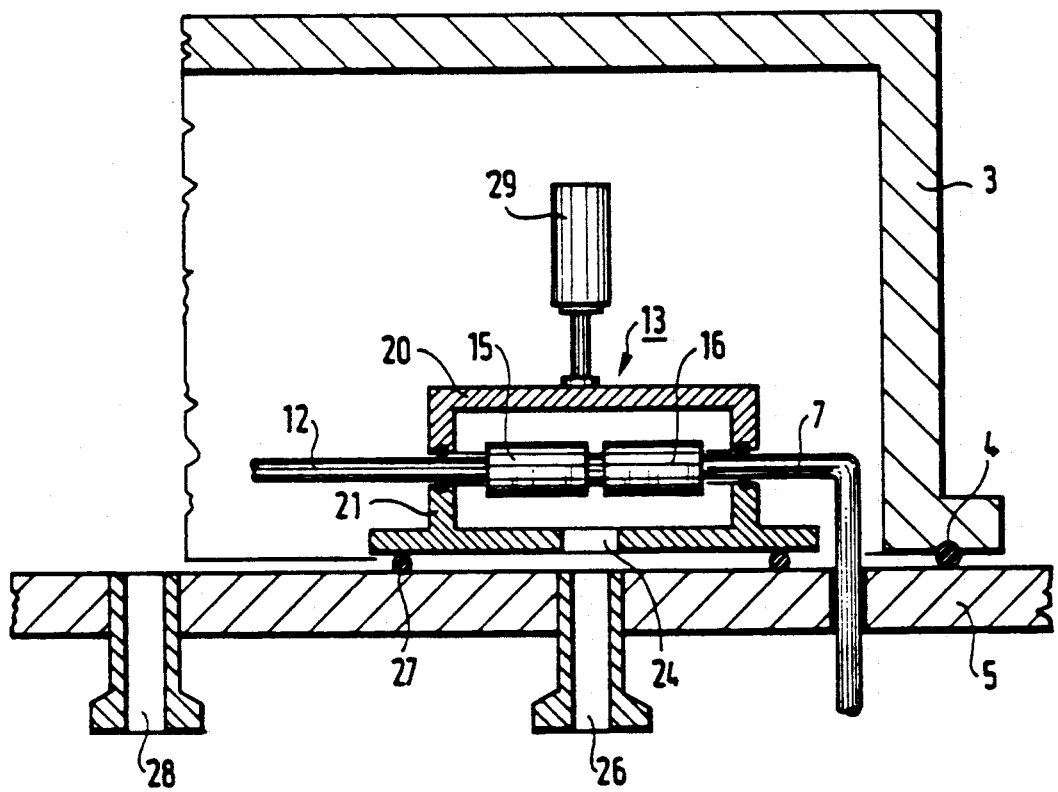
FIGS. 5 and 6 show an embodiment in which the lower part of the collector chamber is attached to the vacuum chamber.

FIG. 5 shows an embodiment in which the collector chamber 13 is fixed in the vacuum chamber 3. To this end the lower part 21 of the collector chamber 13 incorporates fixing lugs 25.

The collector chamber 13 is lined up with the flange 26 to which the vacuum pump 14 is connected and a seal 27 is provided. FIG. 5 also shows the flange 28 to which the leak detector 6 is connected.

Figure 6:
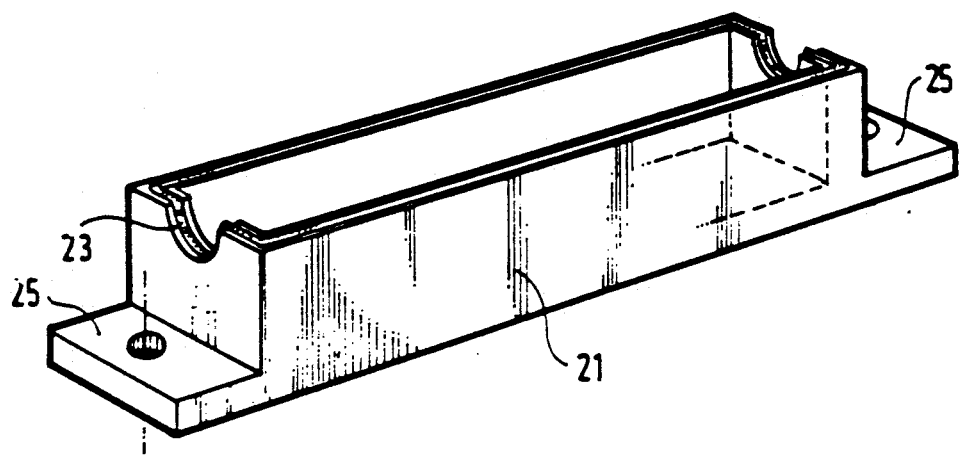

FIG. 6 is a perspective view of the lower part 21 of the collector chamber 13 from the FIG. 5 embodiment.

In FIG. 3 and FIG. 5 the two parts 20 and 21 of the collector chamber are held in contact either by a mechanical closure (clip) or by a ram system 29.

There is claimed:

1. Leak tester comprising a vacuum chamber in which a device under test is placed and a helium leakage detector connected to said vacuum chamber, said device under test being adapted to be filled with helium or with air-helium mixture through an exterior pipe entering said vacuum chamber and incorporating a coupling for connecting it to said device under test and said coupling being surrounded by a collector chamber connected by a pipe to a vacuum pump outside said vacuum chamber.

* * * * *